May 28, 1968   E. A. J. MARCATILI ET AL   3,386,043
DIELECTRIC WAVEGUIDE, MASER AMPLIFIER AND OSCILLATOR
Filed July 31, 1964   3 Sheets-Sheet 1

INVENTORS E.A.J. MARCATILI
R.A. SCHMELTZER
BY
Sylvan Sherman
ATTORNEY

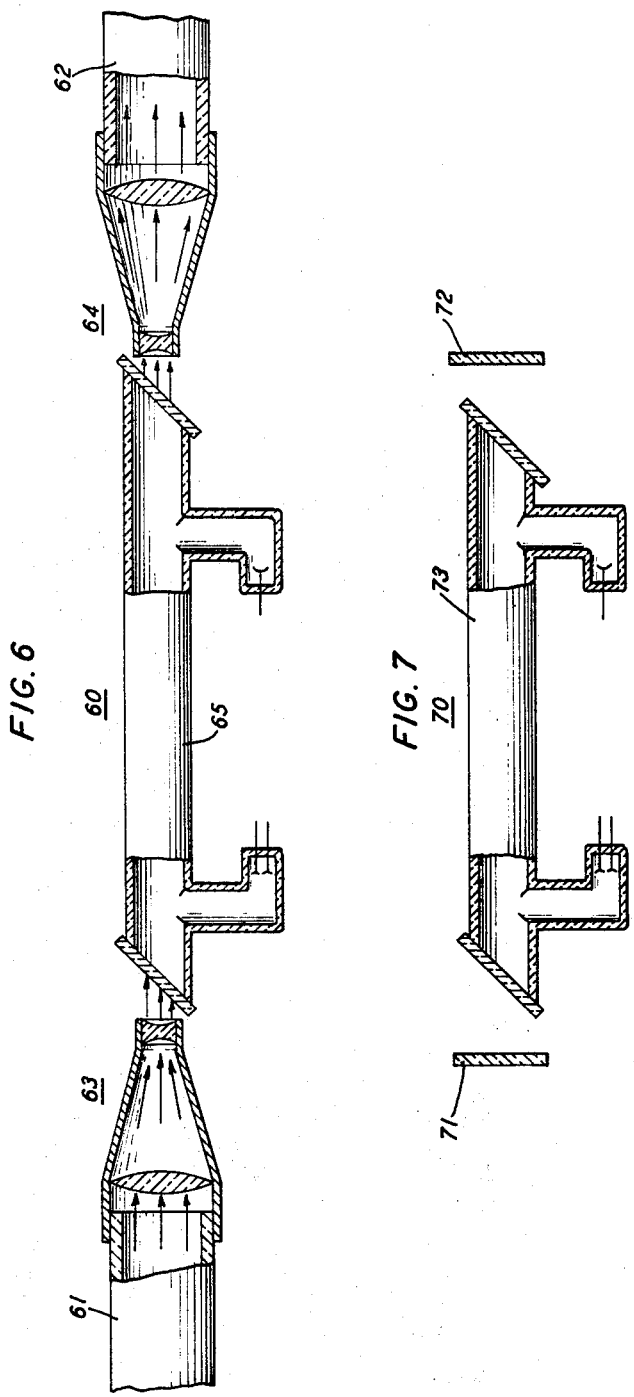

United States Patent Office 3,386,043
Patented May 28, 1968

3,386,043
DIELECTRIC WAVEGUIDE, MASER AMPLIFIER AND OSCILLATOR
Enrique A. J. Marcatili, Fair Haven, N.J., and Robert A. Schmeltzer, Torrance, Calif., assignors to Bell Telephone Laboratories, Incorporated, New York, N.Y., a corporation of New York
Continuation-in-part of application Ser. No. 360,488, Apr. 17, 1964. This application July 31, 1964, Ser. No. 387,554
15 Claims. (Cl. 330—4.3)

ABSTRACT OF THE DISCLOSURE

A dielectric waveguide for guiding electromagnetic wave energy whose wavelength is small compared to the cross-sectional dimensions of the waveguide is described. The waveguide comprises an inner, low-loss dielectric material whose cross-sectional dimensions are greater than ten times the wavelength of the propagating energy, surrounded by an outer, dielectric material of higher dielectric constant. The outer dielectric can be either a metallic or a nonmetallic material.

---

To make transmission through the guide independent of the guide surrounding, means are provided for preventing any wave energy which leaves the inner material from returning thereto.

This invention relates to transmission media for electromagnetic waves and, in particular, to dielectric waveguiding structures whose cross-sectional dimensions are large compared to the wavelength of the wave energy to be propagated therein.

The invention has particular application to waveguiding structures intended for guiding the wave energy over relatively long distances such as at least hundreds of meters and more typically at least several miles.

This application is a continuation-in-part of our copending application Ser. No. 360,488, filed Apr. 17, 1964.

In the transmission of electromagnetic wave energy through a hollow conductive pipe or other waveguide, it is well known that the energy can propagate in one or more transmission modes, or characteristic field configurations, depending upon the cross-sectional size and shape of the particular guide, and upon the operating frequency. Typically, at any given frequency, the larger the guide size the greater is the number of modes in which the energy can propagate. Normally, it is desired to confine propagation to one particular mode chosen because its propagation characteristics are favorable for the particular application involved, and because propagation in more than one mode gives rise to conversion-reconversion distortion and other deleterious effects.

If the desired mode happens to be the so-called dominant mode, and the wavelength of the wave energy is large enough, it is feasible to restrict the cross-sectional dimensions of the guide so that no modes other than the dominant mode can be sustained therein. This expedient is not applicable, however, if the desired mode is not the dominant mode or if a guide of larger cross section is prescribed in order to minimize attenuation or for other reasons. These oversized, or multimode waveguides, are inherently capable of propagating more than one mode and, as such, are potentially troublesome. In these instances it becomes necessary to go to more complicated waveguiding structures such as, for example, the helical waveguide.

The advent of the optical maser as a source of coherent radiation at optical wavelengths has substantially magnified the problems of guiding electromagnetic wave energy over long distances. Because of the extremely small wavelengths involved, none of the techniques considered above, or currently known in the art, provides a practical means of obtaining efficient transmission.

The desired characteristics of a multimode transmission medium are low loss for the preferred mode; high loss for all other modes; a minimum number of discontinuities and potential imperfections within the wavepath; the ability to negotiate short radius bends; and low original and maintenance costs.

In accordance with the invention, these characteristics are realized in a transmission medium comprising a pair of coaxial dielectric cylinders. The inner cylinder, which has a radius that is large compared to a wavelength of the wave energy to be propagated therein, can be either a low-loss solid material or a gas, such as nitrogen, or this region can be evacuated. The outer cylinder comprises a second dielectric material having a higher dielectric constant than the inner cylinder.

While metals are generally not considered to be dielectric materials, they are nevertheless known to exhibit large dielectric constants at optical frequencies. Accordingly, the term "dielectric material," as used hereinafter, shall be understood to include all materials, both metals and nonmetals which exhibit the requisite dielectric constant at the frequency of operation. (See M. Parker Givens, "Optical Properties of Metals," Solid State Physics, vol 6, Academic Press Inc., New York 1958.)

To confine the propagating wave energy within the region of the inner cylinder of the waveguide and make its transmission therethrough independent of the guide's surroundings, means are provided for preventing wave energy, which leaves the inner cylinder, from returning thereto with any appreciable amplitude. This process of decoupling the waveguide from its surroundings is accomplished by the introduction of loss to the waveguiding structure.

In a first embodiment of the invention, decoupling is accomplished by making the outer cylinder of the waveguide lossy to the wave energy propagating therein and by selecting its thickness such that a large round-trip attenuation is experienced by any wave energy which leaves the inner cylinder of the guide and is reflected back. As a consequence, the mode of configuration and field distribution of the wave energy within the guide is dependent only upon the electrical properties of the waveguide and is independent of its surroundings.

In second and third embodiments of the invention, the loss is provided by surface treating either the outer surface of the outer cylinder or by surface treating the inner surface of a surrounding protective jacket. The effect sought here is to scatter any wave energy which leaves the inner cylinder of the waveguide.

In other embodiments of the invention, a length of dielectric waveguide is used as the waveguiding structure for gaseous maser amplifiers and oscillators. By relating the radius $a$ of the waveguide to the length $b$ of the amplifier and the wavelength, $\lambda$, of the signal such that $a^2$ is less than $0.5\ b\lambda$, a substantial increase in gain can be realized.

These and other objects and advantages, the nature of the present invention, and its various features, will appear more fully upon consideration of the various illustrative embodiments now to be described in detail in connection with the accompanying drawings, in which.

Figure 3:
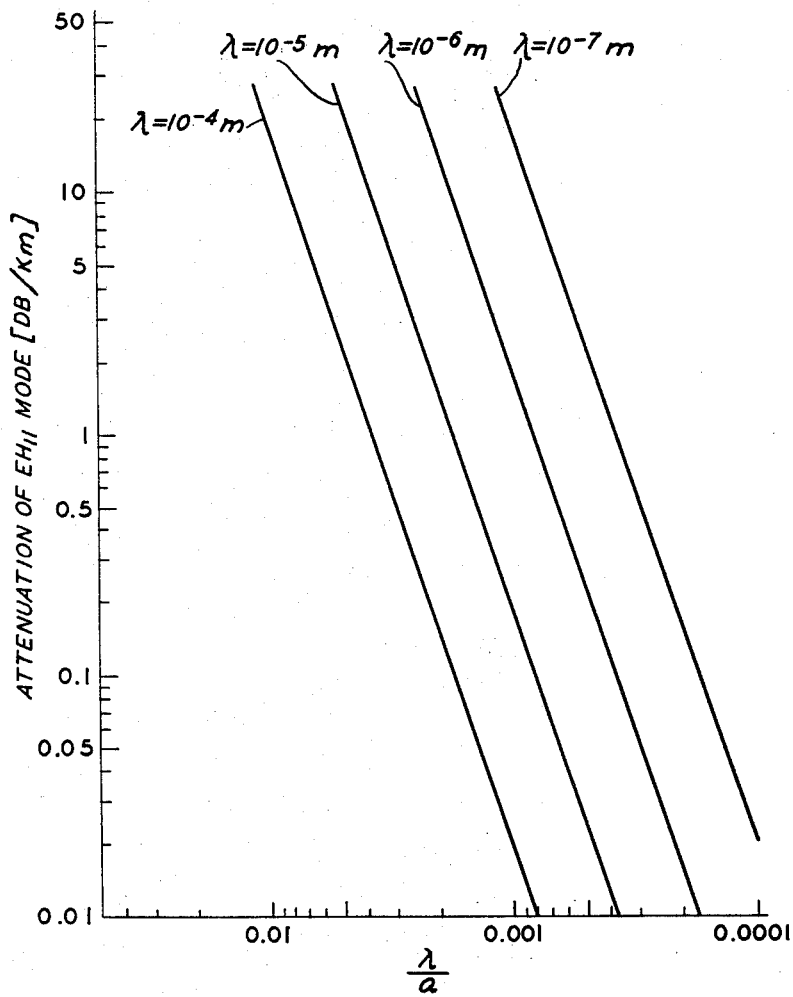
Figure 4:
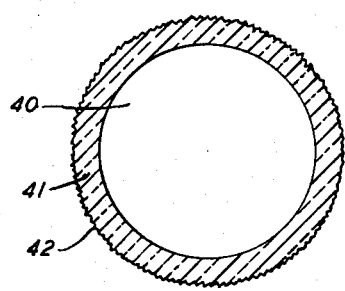
Figure 5:
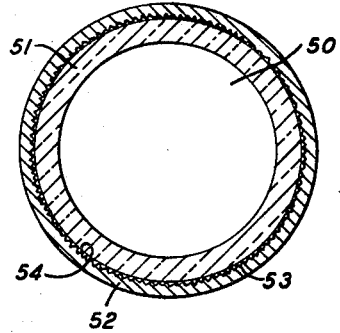

FIG. 3, included for purposes of explanation, is a plot of the attenuation of the $EH_{11}$ mode in a dielectric bounded waveguide as a function of the ratio of signal wavelength to guide radius;

FIG. 4 is a second embodiment of the invention using a low-loss material for the outer cylinder whose outer surface is treated to scatter reflected wave energy;

FIG. 5 is a third embodiment of the invention using a low-loss material for the outer cylinder surrounded by a protective jacket whose inner surface is treated to scatter reflected wave energy;

FIG. 6 shows a maser amplifier utilizing a dielectric waveguiding structure, proportioned in accordance with the teachings of the present invention, to increase the amplifier gain; and FIG. 7 shows a maser oscillator utilizing planar mirrors and a dielectric waveguiding structure, proportioned in accordance with the teachings of the present invention, to increase the oscillator gain per transit.

Figure 1:
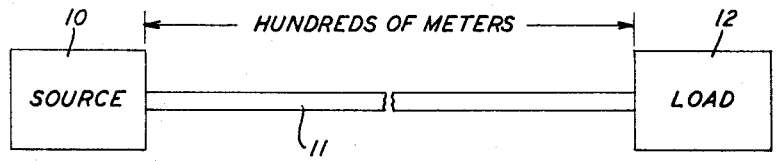
FIG. 1 shows a long distance transmission system utilizing a waveguide structure in accordance with the present invention.

Referring to FIG. 1, there is illustrated a typical long distance, guided wave transmission system in which the present invention has utility. The system is characterized as long so as to define a system in which the factor of transmission attenuation is important. The length of such a system would be measured in hundreds of meters or miles.

The system comprises a source 10 of millimeter or optical wave energy, which source can be a transmitter, of if this is an intermediate station, a repeater. Source 10 is connected by means of a dielectric transmission line 11 to a load 12, which can be either the terminal end of the system or another repeater.

The transmission line is further characterized as having cross-sectional dimensions that are large compared to the wavelength of the wave energy propagating therein. For millimeter waves, cross-sectional dimensions of the order of hundreds of wavelengths are typical. For optical waves, cross-sectional dimensions of the order of thousands of wavelengths are typical.

Figure 2A:
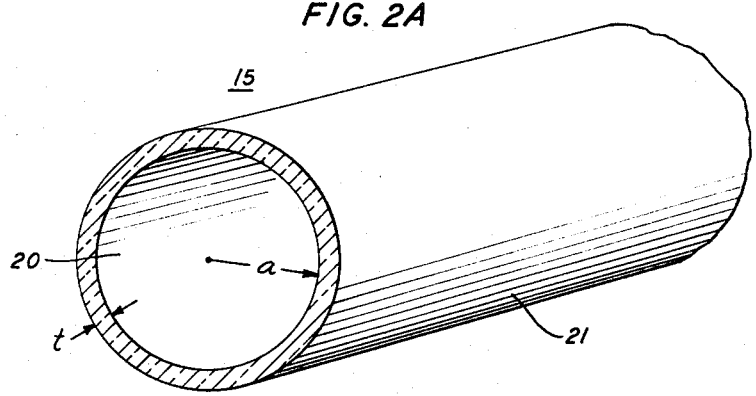
FIG. 2A illustrates, in more detail, a first embodiment of a dielectric waveguide in accordance with the invention using a lossy dielectric material for the outer cylinder.

FIG. 2A is a detailed drawing of line 11. The latter comprises a first, inner cylinder 20 of radius $a$ and dielectric constant $\epsilon_1$, included within a second outer, cylinder 21 of dielectric constant $\epsilon_2$ and thickness $t$.

The inner cylinder 20, within which the useful wave energy is confined, is preferably, composed of an inert gas, such as nitrogen, or this region is evacuated in order to minimize losses. Cylinder 20 can, alternatively, be a low-loss solid dielectric material. However, it is required, for the purpose of this invention, that the region referred to as the inner cylinder be characterized by a dielectric constant that is less than the dielectric constant of the outer cylinder material.

One example of a waveguide of the type described above, is a hollow tube of lossy glass. If the wavelength, $\lambda$, of the energy to be propagated within the tube is much smaller than the internal radius $a$ of the tube, ($\lambda \leq 0.1\ a$), the energy propagates not in the glass, but essentially inside the hollow of the tube, bouncing against the tube walls at grazing angles.

At optical frequencies at which a metal exhibits significantly large dielectric constants (i.e., 80 for aluminum) a hollow tube of such a metal can be used.

Figure 2B:
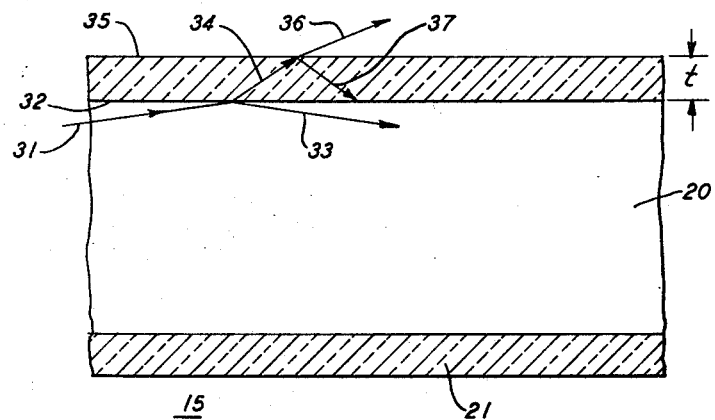
FIG. 2B is a longitudinal section of waveguide, included for purposes of explanation.

As the wave energy strikes the inner wall of the tube, most of it is reflected back into the hollow of the tube. A small portion, however, is refracted and enters the wall. This is illustrated in FIG. 2B, which shows a longitudinal section of a portion of the waveguide 11 in which wave energy, represented by arrow 31, strikes the inner surface 32 of the outer dielectric material. Most of the wave energy is reflected and continues to propagate within the waveguide as represented by arrow 33. A small amount, however, is refracted at the surface and enters the outer cylinder 21 as indicated by arrow 34. This portion of wave energy then strikes the outer surface 35 of cylinder 21 and is again reflected and refracted. The refracted portion 36 leaves the guide and is lost. The reflected portion 37, however, is directed inward and is thus capable of reentering the inner cylinder 20 and recombining with the propagating wave energy.

It can be shown that little energy is lost because of refraction under these conditions. However, because the refracted portion of the propagating wave is partially reflected at the external surface of the tube, it can interfere either constructively or destructively with the useful field inside the tube, decreasing or increasing the attenuation. In addition, the reflected energy would have a phase and amplitude which would depend upon the nature of the material surrounding the guide. This surrounding material would therefore have an effect upon the wave energy propagating within the guide. To eliminate this random effect altogether and make the wave energy independent of the material surrounding the guide, loss is introduced in the outer cylinder of the waveguide. In an optical system this is done by the use of a glass which is absorbing at the frequency of operation or by frosting the outer surface of the tube. With the refracted wave thereby attenuated to a negligible level, the field inside the tube is not influenced by either the thickness of the tube or by the medium surrounding the waveguide.

Assuming, for purposes of computation, that the refracted wave propagates through the outer cylinder in a radial direction, and hence, travels a distance $2t$ before reentering the inner cylinder of the waveguide, the minimum thickness $t$, for an attenuation of A decibels is given approximately by $$t = \frac{\lambda A}{2\pi\sqrt{Re\epsilon_2/Re\epsilon_1}(8.686 \tan \delta)} \quad (1)$$

where $Re_{2\epsilon}$ and $Re\epsilon_1$ are the real parts of the complex dielectric constants $\epsilon_2$ and $\epsilon_1$ of the outer and inner cylinders of the waveguides, respectively;

and $\tan \delta$ is the loss-tangent of the outer cylinder

In actuality, the refracted wave propagates a distance that is much greater than $2t$ and, hence, the actual attenuation is substantially greater than A.

For metals, the loss-tangent is very large and the approximation for $t$ given by Equation 1 is much larger than is actually required.

It should be noted, however, that while $t$ is advantageously made large enough to reduce the amplitude of the refracted wave to a negligible level, making $t$ less than optimum does not make the waveguide useless. All it does mean is that the attenuation of the guide may be increased (or decreased) somewhat and that the propagation properties of the guide may vary somewhat as a function of the guide's surroundings. Thus $t$ is not a critical dimension, and generally any practical thickness will be adequate for this purpose.

In prior art waveguiding structures using hollow dielectric cylinders, the propagating mode is not determined by the dielectric material. Typically, the dielectric cylinders are further located within a region of conductively bounded wavepath and it is the latter that defines the field configuration. The dielectric material is simply located in a region of the wavepath in which field intensity has some specified value, either high or low, depending upon whether the dielectric material is, or is not, intended to interact with the propagating wave. Thus, while the dielectric material may disturb the mode, it does not determine it.

In other prior art waveguides that include dielectric materials, the size of the waveguiding structure is generally comparable to the wavelength of the propagating wave and the propagating wave is in a mode that is perturbed by the dielectric material but not determined by it. As a consequence, the wave is adversely affected by a lossy dielectric material.

A metallic dielectric waveguide, in accordance with the the present invention, superficially resembles the prior art metallic waveguides commonly employed at microwave frequencies. However, as will be shown below, when a metallic pipe is used as a waveguide at those frequencies at which the metal has a large dielectric constant, its waveguiding properties are significantly different. For example, in prior art multimode waveguides, it is necessary to go to more complex structures (such as helical waveguides) in order to realize any significant mode selectivity. By contrast, a simple, hollow metallic pipe at optical frequencies exhibits a mode discrimination which can be as high as one hundred decibels.

In the present invention, new classes of modes are utilized whose properties are uniquely determined by the outer dielectric cylinder, yet practically none of the wave energy propagates in this cylinder. The modes, instead, propagate within the region of the waveguide occupied by the inner dielectric cylinder, and while their attenuation varies as a function of the relative dielectric constants of the inner and outer cylinder materials and of the radius of the wavepath, the modes are not adversely affected by the loss characteristic of the outer cylinder. To the contrary, the attenuation decreases as the loss-tangent of the outer cylinder material increases.

A modal analysis of a dielectric waveguide discloses that this structure supports three classes of modes. The first class includes the transverse electric, or $TE_{om}$, modes for which the lines of electric field are circles that lie in planes that are perpendicular to the cylinder axis and centered on it. The lines of magnetic field are perpendicular to the lines of electric field and lie in planes containing the cylinder axis.

The second class of modes is the transverse magnetic, or $TM_{om}$, modes for which the lines of magnetic field are transverse concentric circles centered on the guide axis and the lines of electric field are contained in radial planes.

The third class of modes is the hybrid, or $EH_{nm}$, modes whose lines of electric and magnetic field extend both in the transverse and longitudinal directions.

While the field configurations are reminiscent of the field configurations found in conductively bounded waveguides, the field intensity distribution is distinctly different. Unlike the conductively bounded waveguide, the magnetic and electric field intensities for all modes in the "dielectric waveguide" are a minimum at the guide wall.

The modal analysis also yields quantitative expressions for the attenuation factor $\alpha$, for each of the mode classes. These are given as follows:

$$\alpha_{om} = Re\left(\frac{1}{\sqrt{\nu^2-1}}\right)\left(\frac{\mu_{om}}{2\pi}\right)^2 \frac{\lambda^2}{a^3} \text{ for the } TE_{om} \text{ modes} \quad (2)$$

$$\alpha_{om} = Re\left(\frac{\nu^2}{\sqrt{\nu^2-1}}\right)\left(\frac{\mu_{om}}{2\pi}\right)^2 \frac{\lambda^2}{a^3} \text{ for the } TM_{om} \text{ modes} \quad (3)$$

and $$\alpha_{nm} = \tfrac{1}{2} Re\left(\frac{\nu^2+1}{\sqrt{\nu^2-1}}\right)\left(\frac{\mu_{um}}{2\pi}\right)^2 \frac{\lambda^2}{a^3} \text{ for the } EH_{nm} \text{ modes} \quad (4)$$

where $\nu$ is the relative refractive index and is equal to $\sqrt{\epsilon_2/\epsilon_1}$, where $\epsilon_2$ and $\epsilon_1$ are complex;

and $\mu_{nm}$ is the $m^{th}$ root of the Bessel function of the first class and order $n-1$, where $n$ is any integer including zero.

It will be noted that all of the above attenuation constants are proportional to $\lambda^2/a^3$. Consequently, the losses can be made arbitrarily small by choosing the internal radius, $a$, of the outer cylinder, sufficiently large. FIG. 3 is a graph of the attenuation of the $EH_{11}$ mode in decibels per kilometer for different ratios of wavelength to radius, assuming a relative refractive index of 1.5.

The refractive index also affects the attenuation of the various modes but in a manner that is different for each mode.

For the TE modes, the relationship is straight-forward. The attenuation is high for values of $\nu$ close to unity but decreases monotonically as the refractive index increases. For the TM mode, the attenuation is also high for values of $\nu$ close to unity. As $\nu$ increases, the attenuation decreases, but only until $\nu = \sqrt{2}$. Any further increase in $\nu$ is accompanied by a corresponding increase in attenuation.

The EH modes are similar to the TM modes in this respect. For values of $\nu$ close to unit, the attenuation is high. As $\nu$ increases, the attenuation constant decreases, reaching a minimum for $\nu = \sqrt{3}$. A further increase in the refractive index results in a corresponding increase in the attenuation constant.

Comparing the attenuation constants for the three modes, it is seen that for values of $\nu$ less than 2.02, the $EH_{11}$ mode has the lowest attenuation. However, for values of $\nu$ greater than 2.02, the mode with the lowest attenuation is the $TE_{01}$ mode.

The curves of FIG. 3 illustrate that the attenuation in a straight section of waveguide can be made acceptably small for ratios of $\epsilon_2$ to $\epsilon_1$ as little as 1.5 by the simple expedient of increasing the waveguide radius. However, to realize a high mode discrimination factor and to minimize the adverse effects of bends, the ratio of $\epsilon_2$ to $\epsilon_1$ should be of the order of at least ten to one. As will be shown in the following discussion, the higher this ratio is, the greater the mode discrimination factor and the less the loss due to bends.

So far the attenuation due to refractive loss in a straight waveguide has been considered. It is recognized, however, that a wavepath may include unintentional bends. These are typically a function of the installation. For example, in a carefully laid and adequately supported installation, bends can be made negligibly small. In an outdoor underground installation, on the other hand, temperature changes and ground settling can produce substantial movement of the waveguide and introduce relatively large bends in the system.

There are two ways of avoiding the deleterious effects produced by irregularities in the wavepath. In the first method, the electrical properties of the wavepath are selected to minimize these deleterious effects. The second method seeks to avoid bends by physically controlling the environment in which the waveguide is placed. Both these methods will be discussed briefly.

It can be shown that the attenuation, $\alpha_c$, for a curved section of guide is given, for the $EH_{\pm 1m}$ mode, as:

$$\alpha_c = \alpha_{1m}\left[1 + \frac{4}{3}\left(\frac{2\pi a}{\lambda \mu_{\pm 1m}}\right)^4 \cdot \frac{a^2}{R^2}\left\{1 + \frac{3}{4}\frac{Re\sqrt{\nu^2-1}}{Re\frac{\nu^2+1}{\sqrt{\nu^2-1}}}\cos 2\beta + \frac{1}{(\mu_{\pm 1m})^2}\right\}\right] \quad (5)$$

where $\beta$ is the angle between the polarization axis and the plane in which the curvature takes place, and $\alpha_{1m}$ is the attenuation constant for the $EH_{1m}$ mode in a straight section of waveguide.

For the $EH_{nm}$ ($n \neq 1$), $TE_{om}$ and $TM_{om}$ modes, the attenuation, $\alpha_c$, along a curve, is given as:

$$\alpha_c = \alpha_{nm}\left[1 + \frac{4}{5}\left(\frac{2a}{\lambda\mu_{nm}}\right)^4 \cdot \frac{a^2}{R^2}\left\{1 - \frac{n(n-2)}{(\mu_{nm})^2}\right\}\right] \quad (6)$$

where
$\alpha_{nm}$ is the attenuation constant respectively for the $EH_{nm}$ (where $n \neq 1$), $TE_{om}$ and $TM_{om}$ modes in a straight section of waveguide.

It is seen from Equations 5 and 6 that the additional attenuation experienced going around a bend increases as $$\left(\frac{a^6}{\lambda^4}\right)$$

and, hence, the expedient of increasing the guide size is, in this instance, a detriment. While the guide size can, advantageously, be reduced going around intentional bends, this expedient cannot be used for reducing losses associated with unintentional bends.

Instead, the waveguide is designed so that the attenuation constant for a straight section is maintained low enough so that the additional losses due to bends can be maintained below some predetermined limit. This can be done, for example, by using a material which has a very high dielectric constant. One such material is barium titanate, which has a dielectric constant of 2000 at millimeter wave frequencies. For a wavelength $\lambda = 0.5$ mm. and a guide radius $a = 1$ inch, the attenuation for the $TE_{01}$ mode in a straight waveguide is 1.15 db per kilometer. This attenuation would double in a curved section of guide having a radius of 196 meters.

To reduce the refracted wave energy to a negligible level (by more than 10 db), the thickness of the barium titanate, for the example given above, is given by equation 1 as 0.158 mm.

The extremely high mode discrimination of a dielectric waveguide having a high refractive index is shown by the fact that the attenuation for the $EH_{11}$ mode in a barium titanate waveguide is 455 db per kilometer. Thus, the discrimination factor between the desired $TE_{01}$ mode and the next mode with minimum loss is approximately 454.

At optical frequencies, nonmetallic materials with high dielectric constants are not readily available. Accordingly, at optical frequencies, a metallic pipe would preferably be used. As an example, the amplitude of the relative dielectric constant of aluminum at $\lambda = 1\mu$ is 80. For an aluminum pipe of radius $a = 0.25$ mm., the attenuation constant for the $TE_{01}$ mode is $\alpha_{01} = 1.80$ db/km. This attenuation doubles for a radius of curvature of about 50 meters. Since the radius of curvature of unintentional bends typically encountered is of the order of several hundred meters, the added loss due to such bends would be considerably less since the loss decreases as the third power of the radius of curvature.

The high mode discrimination of the dielectric waveguide is illustrated by the fact that the attenuation discrimination between the $TE_{01}$ and $TE_{02}$ modes for the above example is approximately 425 db/km. The attenuation discrimination for the $TM_{01}$ and the $EH_{11}$ modes are 143 db/km. and 55 db/km., respectively.

The added attenuation due to unintentional bends can also be minimized or avoided by supporting the waveguide in the manner described by F. T. Geyling in United States Patent 3,007,122, issued on Oct. 31, 1961.

Alternatively, the waveguide can be uniformly supported by embedding it in a fluid whose density is just sufficient to float the guide. If $a_o$ is the outside radius of the guide, $a_i$ the inside radius of the outer cylinder, and $\rho_g$ the average density of the outer cylinder material, the density of the supporting fluid $\rho_s$ is then given by:

$$\rho_s = \rho_g\left[1 - \left(\frac{a_i}{a_o}\right)^2\right]. \quad (7)$$

The amount of bending that can be tolerated in the external jacket, (which contains the guide and the supporting fluid) before the guide is affected, depends upon the jacket radius $a_s$. If the radius of the jacket is larger than the maximum deflection $\Delta$ anticipated for the jacket, the guide remains unaffected. If, on the other hand, the deviation $\Delta$ is greater than the difference $a_s - a_o$, the ration of the radius of curvature of the waveguide, $R_g$, to the radius of curvature of the Jacket $R_s$, is given by:

$$\frac{R_g}{R_s} = \frac{1}{1 - \frac{a_s - a_o}{\Delta}}. \quad (8)$$

FIG. 4 illustrates an embodiment of the invention using a low-loss dielectric material for the outer cylinder. As before, the waveguide comprises a low-loss inner dielectric cylinder 40 characterized by a dielectric constant that is less than that of the surrounding dielectric cylinder 41. In this embodiment, however, cylinder 41 is made of a low-loss dielectric material whose thickness is not determined by the same criteria as was used in the embodiment of FIG. 2. In the embodiment of FIG. 4, the requisite loss is provided by surface treating the outer surface 42 of cylinder 41 so that it scatters reflected wave energy. This can be done, for example, by etching the surface. This scattering is electrically equivalent to the loss provided by the outer cylinder in the embodiment of FIG. 2.

While the waveguide has been described as a dielectric waveguide, in the sense that it is the dielectric properties of guide that produce the guiding action, it is to be understood that additional outer jackets would typically be employed to give the guide structural rigidity and protection. Thus, a typical embodiment of the invention would include one or more outer layers which can be metallic or nonmetallic, depending upon the particular application at hand.

In the embodiments of FIG. 2 and FIG. 4 an outer jacket would play no part in the waveguiding properties of the waveguide due to the loss introduced by the outer dielectric cylinder. Under certain conditions, however, this loss can be provided by the protective jacket itself. This is illustrated in the embodiment of FIG. 5.

In this embodiment the inner dielectric cylinder 50 is surrounded by a cylinder 51 of low-loss dielectric material and by a protective jacket 52. The latter can be either metallic or nonmetallic. In this embodiment, however, the outer surface 54 of cylinder 51 is smooth and the requisite loss is provided by surface treating the inner surface 53 of protective jacket 52 in the same manner as the outer surface 42 of cylinder 41 was treated in the embodiment of FIG. 4. Because the wave energy is scattered at the inner surface of jacket 52, the wave energy within the waveguide does not sense the presence of this jacket and, hence, it has no influence upon the wave energy within the guide.

While all the waveguides described above have circular cross sections, it is understood that other cross-sectional configurations, such as elliptical and rectangular, can be used.

In addition to its use as a low-loss transmission path, the hollow dielectric waveguide has utility, when used in short lengths, as the waveguiding element in gaseous maser amplifiers and oscillators.

A wave traveling in a hollow dielectric waveguide filled with masing material, experiences a net gain which is given by the difference between the amplification due to the active medium and the refractive loss due to leakage through the walls.

It has been shown by E. I. Gordon and A. D. White ("Similarity Laws for the He-Ne Gas Maser," Applied Physics Letters, 3, Dec. 1, 1963, p. 199), that in a gas maser, the gain G is inversely proportional to the radius $a$ of the tube. That is $$G = \frac{A}{a} \text{ db/m.} \quad (9)$$

where $a$ is the radius in meters, and

A is the constant equal to 0.00066 db.

From Equation 4 we find that the transmission loss L for the $EH_{11}$ mode in a hollow waveguide is $$L = B\frac{\lambda^2}{a^3} \text{ db/m.} \quad (10)$$

where B is equal to 1.85 db.

The net gain per unit length is then $$(G-L) = \frac{A}{a} - B\frac{\lambda^2}{a^3} \quad (11)$$

Maximizing the gain with respect to the radius, we get for the optimum radius and the maximum net gain the following two expressions:

$$a_{opt} = \sqrt{3\frac{B}{A}}\lambda \quad (12)$$

$$(G-L)_{max.} = \frac{2A}{3\lambda}\sqrt{\frac{A}{3B}} \text{ db/m.} \quad (13)$$

For a He-Ne mixture, ($\lambda = 0.6328 \times 10^{-6}$ m.) and a refractive index $\nu = 1.5$, $$a_{opt} = 0.058$$

$$(G-L)_{max.} = 7.6 \text{ db/m.}$$

It will be noted that the diameter of the tube is quite small compared to the diameters commonly employed in the prior art maser devices, and the gain per unit length is much larger. As a comparison, present day confocal He-Ne masers employing tubes whose approximate length and radius are one meter and three millimeters, respectively, have a gain per passage of only 0.22 decibel. A maser using a hollow dielectric waveguide and having an optimum radius of 0.058 mm., would achieve the same gain in a length of only $$\frac{0.22}{7.6} = 29 \text{ mm.}$$

Even for radii larger than optimum, the hollow dielectric waveguide produces a substantial increase in gain. For example, if $a = 0.25$ mm., the gain is 2.6 db/m., which is far larger than the gain of 0.22 db/m. for the 3 mm. radius tube commonly used.

Thus, a maser amplifier, in accordance with the present invention, is characterized by a smaller radius than prior art masers and a higher gain per unit length $l$. The structural difference is strikingly illustrated by referring to the article by A. G. Fox and Tingye Li, entitled, "Resonant Modes in a Maser Interferometer," published in the March 1961 issue of the Bell System Technical Journal. On page 466 of this article, there is a graph showing the power loss in percent per transit as a function of the ratio $a^2/b\lambda$, where $a$ is the radius of the glass envelope containing the maser material, $b$ is the cavity length, and $\lambda$ is the wavelength of the wave energy.

These curves are based upon a masing device in which the tube, containing the active material, does not guide the wave energy. Guidance is obtained by the reflecting mirrors. It is seen that in such a situation, the power loss becomes extremely large as the ratio $a^2/b\lambda$ becomes less than unity. By contrast, in a maser in accordance with the present invention, the ratio $a^2/b\lambda$ is advantageously less than 0.5, which is a region of the figure for which there are no curves shown since operation in the region below 0.5 is not contemplated.

In FIG. 6 there is shown one arrangement for utilizing a maser amplifier in accordance with the present invention. In this figure, the amplifier 60 is located between two sections of waveguides 61 and 62. The latter can be sections of dielectric waveguide which, in accordance with the discussion above relating to FIG. 2, are as large as necessary to provide a low-loss transmission path. On the other hand, the diameter of amplifier 60 is much smaller, being given by $a^2 < b\lambda$. There are, accordingly, a pair of transducers 63 and 64 located between the waveguide sections 61 and 62 and amplifier 60 for coupling the wave energy to and from the latter. Each of the transducers, as illustrated, includes a positive and a negative lens for changing the beam diameter.

The amplifier comprises a dielectric tube 65 containing a direct current (DC)-excited plasma column as the active element. However, it is understood that other means, well known in the art, can be used to produce the population inversion in the maser material.

To minimize reflections, the ends of tube 65 are inclined at the Brewster angle.

The particular masing material that is used depends upon the frequency of the wave energy to be amplified and would, in general, be the same as the material that was used to generate the wave energy. (For a more detailed discussion of the gas maser see "The Laser" by A. Yariv and J. P. Gordon, published in the January 1963 issue of the Proceedings of the Institute of Raido Engineers.)

In operation, wave energy propagating along guide 61 is coupled to amplifier 60 by means of transducer 63. The wave energy traverses amplifier 60, is amplified by the maser action of the active material within tube 65, and is coupled to the output waveguide 62 by transducer 64. In a long distance system, masers of this type would be located at intervals along the wavepath.

The principles of the present invention are equally applicable to maser oscillators. The oscillator 70, illustrated in FIG. 7 is basically the same as the amplifier of FIG. 6 with the addition of a pair of mirrors 71 and 72 which form a resonant cavity at the frequency of the wave energy emitted by the maser material. Because the wave coming out of the tube is parallel to the tube axis, due to the guiding action of the tube, the mirrors are not needed to focus the wave energy, and hence, parallel planar mirrors are used in the oscillator illustrated in FIG. 7.

In accordance with the invention, the radius of the tube 73, containing the masing material, is related to the distance $b$ between mirrors by $a^2 < b\lambda$, where $\lambda$ is the wavelength of the wave energy. Advantageously $a^2$ is made less than $0.5 \, b\lambda$.

Because of the resulting high gain per transit, and oscillator of this type readily lends itself to applications in which materials are placed within the cavity. Illustrative of such applications is the absorption measurement device described in the copending application by W. W. Rigrod, Ser. No. 317,698, filed Oct. 21, 1963. Another application is an optical modulator in which a birefringent material is used to produce amplitude or phase modulation of the wave energy generated by the maser oscillator.

Thus is all cases it is understood that the above-described arrangements are illustrative of a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. In an optical communication system in which signal information is transmitted over relatively long distances as modulation on an optical frequency carrier;

a waveguide medium for the transmission of said optical frequency carrier between points separated by at least hundreds of meters comprising:

a hollow pipe, extending between said points, of a metal exhibiting a dielectric constant substantially higher than that of the space enclosed thereby at the frequency of said carrier and having an inside radius that is at least ten times larger than the wavelength of said carrier.

2. In an electromagnetic communications system, a dielectric waveguide for the propagation of electromagnetic wave energy at a given frequency comprising:

an inner cylinder of low-loss dielectric material having a first dielectric constant at said frequency surrounded by an outer nonmetallic cylinder of higher loss dielectric material having a second dielectric constant at said frequency that is at least ten times larger than said first dielectric constant;

said inner cylinder having cross-sectional dimensions that are greater than ten wavelengths of the wave energy to be propagated therethrough;

said outer cylinder having a thickness that is sufficient to decouple the wave energy within said waveguide from its surroundings.

3. The waveguide according to claim 2 wherein said inner cylinder comprises a solid dielectric material.

4. The waveguide according to claim 2 wherein said inner cylinder comprises a gaseous material.

5. An electromagnetic wave transmission system comprising:

a source of wave energy of wavelength $\lambda$;
means for utilizing said wave energy;
and waveguiding means for transmitting said wave energy from said source to said utilizing means over a distance of at least hundreds of meters comprising:
a hollow dielectric tube of dielectric constant $\epsilon_2$ and internal radius $a$ greater than $10\lambda$ extending from said source to said utilizing means;
said tube being lossy to said wave energy and having a thickness sufficient to decouple said wave energy from its surroundings;
the region within said tube being characterized by a dielectric constant $\epsilon_1$ less than $\epsilon_2$.

6. The system according to claim 5 wherein the region within said tube is evacuated.

7. The system according to claim 5 wherein the region within said tube is filled with a second dielectric material.

8. A dielectric waveguide for the propagation of electromagnetic wave energy at a given frequency comprising:

a hollow low-loss dielectric tube having an internal radius that is greater than ten times the wavelength of said wave energy;
said tube having a first dielectric constant at said frequency;
the region within said tube being characterized by a second dielectric constant at said frequency that is less than said first dielectric constant;
a protective jacket surrounding said waveguide;
and means for scattering said wave energy located between said guide and said jacket.

9. The guide according to claim 8 wherein said scattering means is located along the outer surface of said tube.

10. The guide according to claim 8 wherein said scattering means is located on the inner surface of said jacket.

11. A maser amplifier comprising:
a hollow dielectric tube containing an active material disposed within a resonant cavity;
characterized in that said tube has an internal radius $a$ that is greater than ten times the wavelength $\lambda$ at which said maser amplifiers, and a cavity length $b$ such that $$\frac{a^2}{\lambda b} \leq 0.5$$

and wherein said tube is lossy at said wavelength.

12. A maser oscillator comprising:
a hollow dielectric tube containing an active material disposed therein;
said tube located within a resonant cavity defined by a pair of planar reflecting surfaces;
characterized in that the internal radius $a$ of said tube is greater than ten times the wavelength $\lambda$ at which said maser oscillates, and the distance between said surfaces $b$ is such that $$\frac{a^2}{b\lambda} \leq 0.5$$

and wherein said tube is lossy at said wavelength.

13. An electromagnetic wave transmission system comprising:

a source of coherent optical wave energy of wavelength $\lambda$;
utilization means;
and means for guiding said wave energy over a distance of hundreds of meters between said source and said utilization means comprising a hollow dielectric tube of internal radius $a$ greater than $10\lambda$ and dielectric constant $\epsilon_2$;
wherein said tube is lossy at the wavelength of said wave energy;
and wherein the region within said tube is characterized by a dielectric constant $\epsilon_1$ less than $\epsilon_2$.

14. The waveguide according to claim 13 wherein said outer cylinder is metallic.

15. The waveguide according to claim 13 wherein said outer cylinder is nonmetallic.

References Cited

UNITED STATES PATENTS

| | | | |
|---|---|---|---|
| 2,929,034 | 3/1960 | Doherty | 333—95 |
| 3,016,502 | 1/1962 | Unger | 333—95 |
| 3,157,726 | 11/1964 | Hicks et al. | 333—95 |
| 3,253,500 | 5/1966 | Hicks | 350—96 |
| 3,275,955 | 9/1966 | Prache | 333—95 |
| 3,275,956 | 9/1966 | Prache | 333—95 |

OTHER REFERENCES

Bergmann, "Journal of Applied Physics," February 1960, pp. 275–276.

"Advances In Quantum Electronics," edited by Singer, Columbia University Press, 1961, New York, pp. 348–369 (pp. 348, 358–360 and 365–369 relied on) (article by Snitzer).

ROY LAKE, *Primary Examiner.*

DARWIN HOSTETTER, *Examiner.*